US006434138B2

(12) United States Patent

Kersken et al.

(10) Patent No.: US 6,434,138 B2
(45) Date of Patent: *Aug. 13, 2002

(54) PROCESS FOR TRANSMITTING MESSAGES BY DIGITAL SOUND BROADCASTING AND RECEIVER FOR CARRYING OUT THIS PROCESS

(75) Inventors: Ulrich Kersken, Diekholzen; Karin Hempel; Thomas Lauterbach, both of Hildesheim, all of (DE)

(73) Assignee: Robert Bosch GmbH, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,968

(22) PCT Filed: Apr. 26, 1997

(86) PCT No.: PCT/DE97/00858

§ 371 (c)(1), (2), (4) Date: Apr. 22, 1998

(87) PCT Pub. No.: WO97/42723

PCT Pub. Date: Nov. 13, 1997

(30) Foreign Application Priority Data

May 8, 1996 (DE) ........................................ 196 18 341
Jul. 26, 1996 (DE) ........................................ 196 30 195

(51) Int. Cl.[7] ................................................ H04J 3/24

(52) U.S. Cl. ..................................................... 370/349

(58) Field of Search ................................ 370/310, 312, 370/328, 336, 343, 345, 349, 470, 471, 473, 494, 495, 498, 522, 527, 528, 529; 455/185.1, 186.1; 340/905, 907

(56) References Cited

U.S. PATENT DOCUMENTS

| | | | | | |
|---|---|---|---|---|---|
| 4,716,364 | A | | 12/1987 | Guilford et al. | |
| 5,206,641 | A | * | 4/1993 | Grant et al. | 340/905 |
| 5,303,401 | A | * | 4/1994 | Duckeck et al. | 455/186.1 |
| 5,752,177 | A | * | 5/1998 | Siegle et al. | 455/186.1 |
| 5,757,782 | A | * | 5/1998 | Gaskill | 370/313 |
| 5,848,354 | A | * | 12/1998 | Kamalski | 455/38.1 |
| 5,982,296 | A | * | 11/1999 | Wakasa et al. | 340/827 |

FOREIGN PATENT DOCUMENTS

| | | |
|---|---|---|
| DE | 34 01 594 | 9/1984 |
| DE | 36 26 328 | 2/1988 |
| DE | 41 34 461 | 4/1993 |
| DE | 42 22 877 | 1/1994 |
| EP | 0 565 470 | 10/1993 |
| EP | 0 710 844 | 5/1996 |
| JP | 10 082816 | 6/1998 |
| WO | WO 95/19668 | 7/1995 |

OTHER PUBLICATIONS

Plenge, "Dab–Ein Neues Horrundfunksystem Stand Der Entwicklung Und Wege Zu Seiner Einfuhrung", Bd. 35, Nr. 2, pp. 45–66.**

I. Mitterhummer et al., "Datenrundfunk Mit Dab", Funkschau, Bd. 67, Nr. 22, pp. 45–48.**

* cited by examiner

*Primary Examiner*—Kwang B. Yao
(74) *Attorney, Agent, or Firm*—Kenyon & Kenyon

(57) ABSTRACT

A method for transmitting traffic announcements via Digital Audio Broadcasting (DAB), making use of the TMC code, where it is possible to have a simple allocation of the audio signals to the TMC data. In this context, the allocation is predetermined by the data frame of the digital transmitter and by the corresponding data protocol.

33 Claims, 3 Drawing Sheets

PROCESS FOR TRANSMITTING MESSAGES BY DIGITAL SOUND BROADCASTING AND RECEIVER FOR CARRYING OUT THIS PROCESS

FIELD OF THE INVENTION

The present invention relates to a method for transmitting announcements from a traffic information warning service which makes use of Digital Audio Broadcasting (DAB), and to a receiver for receiving and for selectively reproducing (playing back).

BACKGROUND INFORMATION

At the present time, traffic announcements for road users are made up of announcements broadcast by analog transmitters. The digital traffic information warning service, Radio Data System (RDS), comprising a Traffic Message Channel (TMC), constitutes a further development. The structure and the coding of the digital traffic information messages are defined in CEN Draft pr. ENV/278/4/1/0011, which is based on the proposed standard Alert C, November 1990, published by RDS ATT Alert Consortium. In this context, the essential elements of a traffic information message are the location of the event (location) and the event. These pieces of information are cataloged, i.e., a unique code is assigned to each location and event that are relevant to traffic. The locations are concatenated in the table of locations along existing streets to reproduce the sequence. Besides the usual receiver devices comprising a decoder, to make use of the Traffic Message Channel TMC, devices are needed for decoding, storing, further processing, and for outputting the traffic information message. Speech conversion is required to decode these digitally coded traffic information messages. This is associated with substantial complexity, so that in countries or regions of small populations where a certain language is spoken, one should not expect that any TMC system will be introduced in the foreseeable future. However, in contrast to traffic information messages of the TMC system, traffic information messages as announcements—described as traffic announcements in the following—are not able to be selected with respect to their geographic allocation.

At the same time, one has to expect that digital broadcasting of the Digital Audio Broadcasting (DAB) will become more and more prevalent. Compared to the old analog methods, digital broadcasting has the advantage of a much more reliable reception, with a sound quality comparable to that of a CD. The specifications of digital sound broadcasting are defined in ETS 300401, February 1995. To transmit the TMC messages, provision is made in the digital sound broadcasting protocol for a channel, i.e., the Fast Information Channel (FIC). However, the terminal equipment currently available for digital sound broadcasting still does not include any decoder for TMC messages. Thus, at the present time, in digital sound broadcasting, it is only the traffic information messages integrated in the sound broadcast program which can be output, which, however, as in the case of the analog method, can neither be selected nor managed in any way.

SUMMARY OF THE INVENTION

In contrast, the advantage of the method of the present invention is that the digital transmission of the sound broadcast renders possible a simple allocation to the data of the digital traffic information warning system. Another advantage is that the transmission of TMC data via digital radio broadcasting is carried out much more effectively, since reception difficulties are much less when working with the digital method. This is especially useful in regions having multipath reception (mountains, multi-story buildings, or cities) and/or in regions serviced by transmitters that broadcast ARI at the same time.

It is especially beneficial to link the TMC messages in the FIC data channel and the traffic announcements in the digital radio with the help of data blocks, so-called link objects. In this case, the uniqueness of the allocation is assured because of the parallelism of the transmission and the connection to the transmitter.

It is advantageous for the beginning and the end of a traffic announcement in the digital radio to be signaled by a speaker pressing a button, the signaling being handled by the TMC transmission control.

In another advantageous embodiment, the data of the traffic announcement are not transmitted by the actual sound broadcast program, instead separately transmitted audio segments are used. This makes it possible for spoken announcements to be transmitted in different languages and, thus, for the correct language to be selected in the receiver. One advantageous exemplary embodiment of a receiver, which makes it possible for spoken announcements to be received in accordance with the method of the present invention, contains a DAB decoder, as well as a TMC decoder and a corresponding management device.

BRIEF DESCRIPTION OF THE DRAWINGS

The method of the present invention is used to transmit TMC messages, traffic announcements, and other optional information, such as street maps, to traffic information messages in the digital sound broadcast. The digital sound broadcast (DAB) renders possible a parallel transmission of text, and audio or video sequences. In each case, a DAB ensemble is broadcast by a DAB transmitter. In FIG. 1, such an ensemble is characterized in level A by the term "north". An individual program, e.g., a sound broadcast program, is described as a service, see level B. NDR1 and FFN are named, for example, as services in FIG. 1. A service can comprise a plurality of components, called service components, e.g., audio, data, video components, etc. These components are shown on level C. One of the possible components is TMC. On level D, the data frame of the digital sound broadcast, subchannels are assigned to the individual service components. A special channel FIC (Fast Information Channel) defines the specification of the digital sound broadcast for the TMC messages in accordance with ETS 300 401. The various subchannels are combined under the designation MSC Main Service Channel. The entire data block is given a frame structure by the transmitter, the data also being preceded by a synchronization word Sync. The area of the Fast Information Channel (FIB) that is relevant to the digital traffic announcement is divided among a plurality of Fast Information Blocks (FIB). The FIBs are divided up among a plurality of data types and extensions. A Fast Information Block is depicted in FIG. 2 on level E. The actual data field comprises 30 bytes, while the control field CRC (Cyclic Redundancy Check) comprises 2 bytes as an error protection code. The actual data field has a plurality of extensions on level F. A special extension is composed of a header and the extension data; see level G. This structure from level G represents a Fast Information Data Channel (FIDC). In accordance with proposed protocol ETS 300 401, the Fast Information Data Channel (FIDC) corresponds to data type 5. In accordance with level H, the header of the FIDC includes the designation of type 5, the information on the length of the extension, an Rfu 0 (reserved for future), TcId (Type Component Identifier), as well as Ext 1 as a first extension of the FIB. The actual pieces of information follow in the extension data areas, it being possible for up to six TMC groups to be transmitted. The groups contain a traffic message encoded with 37 bits. If an FIB is not completely used by extensions, then a data end marker follows the last extension, the remaining length is filled with padding bytes.

Figure 1:
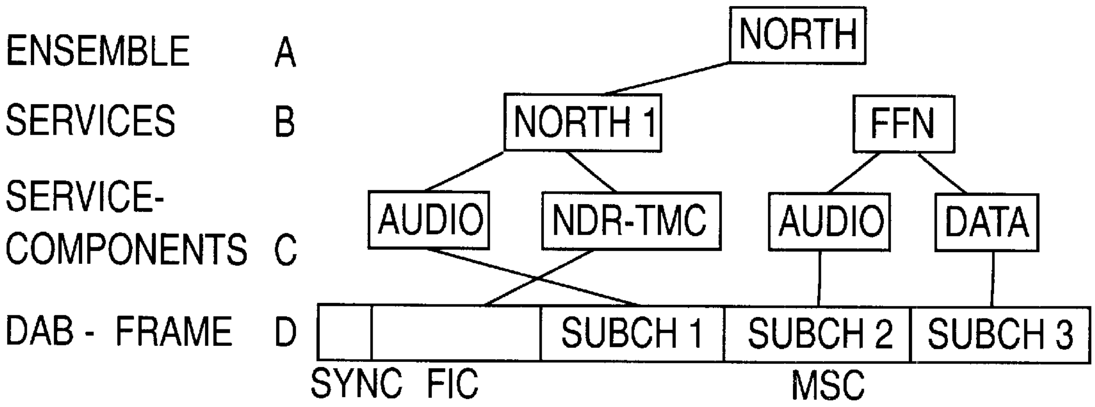
FIG. 1 shows the basic structure of the digital broadcast.
Figure 2:
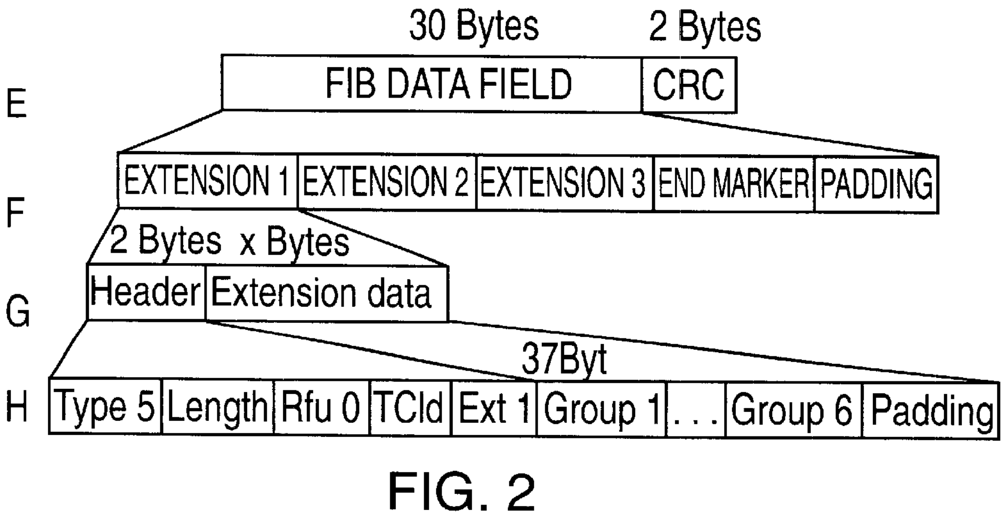
FIG. 2 shows the structure of an FIB (Fast Information Block).
Figure 3:
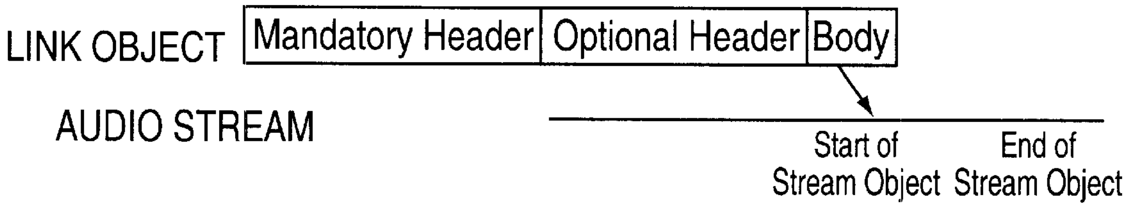
FIG. 3 indicates the starting point of a parallel transmission.

The transmission within the data frame structure defined by the transmitter is carried out for data in packed mode (e.g., multimedia objects) and for sound broadcast programs in stream mode (e.g., spoken announcements). A multimedia object is made up (see FIG. 3) of a mandatory header having a length of 10 bytes, as well as of an optional header having a variable length, and of the object body which contains the actual data. Special media objects, i.e. the link objects, are used to concatenate TMC messages in the Fast Information Channel and traffic announcements in the audio stream. These objects refer, on the one hand, to one portion of the audio stream containing the traffic announcement (mandatory header and body) and, on the other hand, they include the reference to the TMC message (optional header). In this context, reference is not made to the Fast Information Data Channel, but rather to the service component of level C, from where the TMC message comes. The uniqueness is assured because of the parallelism of the transmission and the connection to the service. In the transmitter, the beginning and the end of the traffic announcement is signaled by the speaker or technician depressing a button. When the beginning of a traffic announcement is signaled, the TMC message to this effect is transmitted once in the Fast Information Data Channel. In parallel thereto, in the same digital radio data frame, a link object is produced, in that reference is made to the starting point of the audio stream, i.e., to the beginning of a traffic announcement, and the connection to the TMC message is established. In signaling the end of a traffic announcement, another header is produced in one of the following data frames, which indicates the end point of the audio stream. In the receiver, the identified portion of the audio stream is stored, together with the corresponding TMC message, and is available in other applications, such as a selection. In the Fast Information Channel, only one TMC message may be transmitted within the digital radio data frame in which the multimedia object is transmitted. The TMC messages in other data frames have no significance, even when the audio stream has not yet ended, since these are not referred to by the link object. All that is permitted is the linking of an audio stream with the TMC messages, since the synchronization can only be performed by a program. Usually, a plurality of services can access one and the same service component, but only one service can determine the content of the service component.

In another advantageous specific embodiment, a different link object structure is selected. In this context, the TMC message is no longer transmitted over the FIC channel, rather the link object's optional header contains the TMC message itself. In this context, the audio stream is marked, as described in FIG. 3 and above. At the beginning of a traffic announcement, the TMC message to this effect is entered into the optional header of the link object. In parallel thereto, reference is made in the link object to the starting point of the audio stream, i.e., to the beginning of a traffic announcement. When the end of a traffic announcement is signaled, another header indicating the end point of the audio stream is produced in the data frame. The identified portions of the audio stream, together with the corresponding TMC message, are stored in the receiver and are available for further applications. This specific embodiment enables each program to provide for its own individual traffic announcements, which can be selected.

Figure 4:
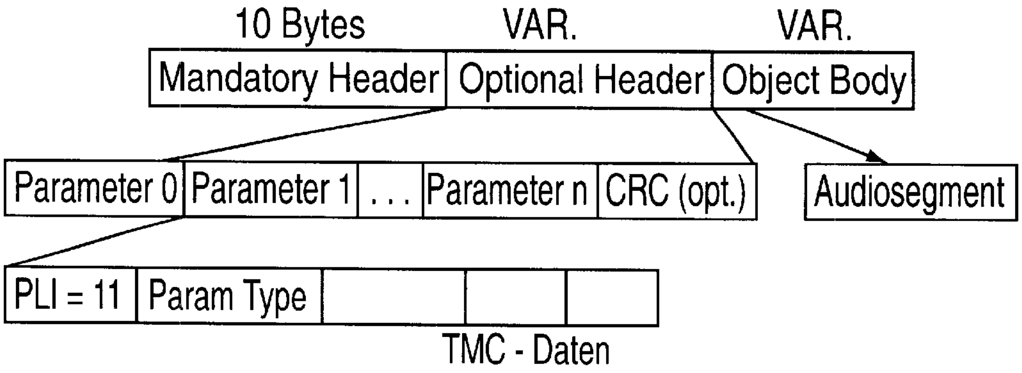
FIG. 4 depicts a multi-media object including an audio segment.

In another specific embodiment, the parallel audio stream, i.e., the sound broadcast program, is not used to transmit the traffic announcements, rather the announcements are assigned to a separately transmitted audio segment. In this context, it is advantageous for an audio segment to correspond to a traffic announcement. The program makes available the traffic announcements as audio segments and as TMC messages. The TMC messages are transmitted in accordance with FIG. 4 in the optional header of the multimedia object. The audio segment is adjusted in the object body area. The TMC message can also be optionally transmitted in the object body, and the audio segment in the optional header.

Figure 5:
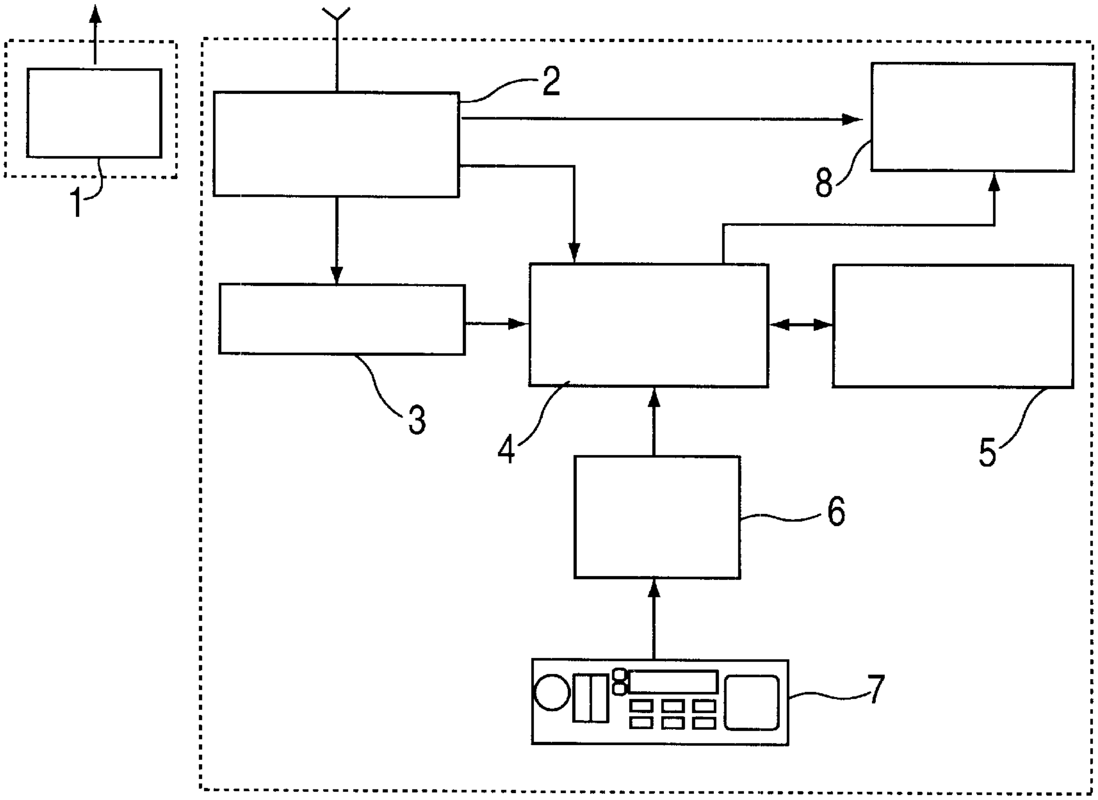
FIG. 5 shows a block diagram of the receiver.
Figure 6:
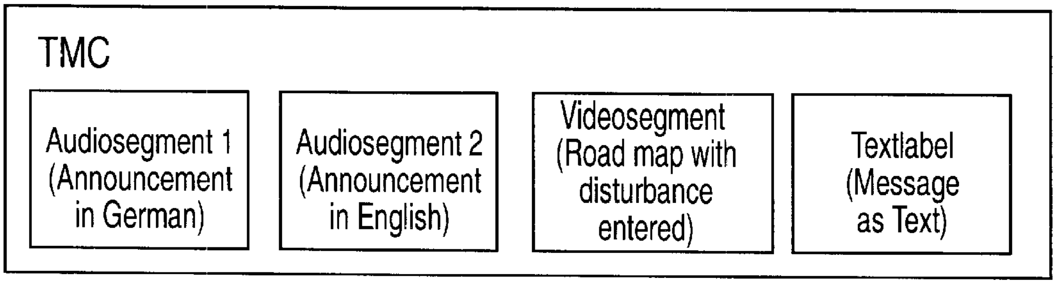
FIG. 6 shows an example of an object set (record) in the memory of the receiver.

A further refinement of the method according to the present invention involves transmitting a plurality of audio segments, video segments, and text labels in the optional header. This makes it possible to make the traffic announcements available in different languages, as well as to graphically display the traffic disturbance on a road map, and to make the text representation of the message visible directly in the receiver. A receiving segment that works in accordance with the method of the present invention is depicted in FIG. 5. The sound broadcast programs, the TMC messages, and other data are transmitted from transmitter 1 via digital radio broadcasting. In DAB decoder 2 in the vehicle itself, audio and video signals of the running programs are first decoded, generated and fed to recorder unit 8. The multimedia objects and the data channels are then decoded. The TMC messages are fed to TMC decoder 3; the audio and video segments, and the text inputs are sent to management 4. The TMC decoder decodes the TMD messages and likewise routes them to management 4. In management 4, the objects arising from the DAB decoder are managed with the aid of the TMC messages. The correct correlation of the objects to one another, as well as the storage in memory 5, and the updating and possible erasing of the objects stored in memory 5 are controlled by management. By way of an input device 7, the user can input selection criteria, e.g., highway numbers. These inputs are compared at 6 to the information contained in the TMC messages and, if indicated, output. FIG. 6 depicts a possible configuration of a TMC message for an object set, which contains various audio segments, video segments, and text messages. These messages can likewise be selected via the selection.

What is claimed:

1. A method for transmitting traffic announcements via a Digital Audio Broadcasting, comprising the steps of:

transmitting a message from a digital traffic information warning system; and assigning data of the message from the digital traffic information warning system to announcement data of a digital radio via a transmitter's data frame structure.

2. The method according to claim 1, wherein digital signals are transmitted in a direct time correlation with the announcement data, the announcement data being in a digital form.

3. The method according to claim 1, wherein messages of a traffic message channel complying with an alert C protocol are used as digital signals.

4. The method according to claim 3, further comprising the step of concatenating the digital signals and the announcement data via multimedia objects.

5. The method according to claim 1, wherein the announcement data includes headers and a data area.

6. The method according to claim 1, wherein a beginning and an end of the announcement data are indicated by a link object having a special header.

7. The method according to claim 1, wherein a link object contains a reference to a digital message in an optional header, and the link object marks a beginning of the announcement data in an audio stream in a header plus a body.

8. The method according to claim 1, wherein a multimedia object itself transmits a digital message in a header.

9. The method according to claim 1 wherein a multimedia object contains both data of the message from the digital traffic information warning system and the announcement data as an audio segment.

10. The method according to claim 1 wherein the announcement data includes a digitized voice signal.

11. The method according to claim 1, further comprising:

transmitting the digitally-encoded traffic message in a special channel.

12. A receiver for receiving and selectively reproducing traffic announcements, comprising:

means for receiving the traffic announcements in connection with digital messages; and a decoder for decoding both the traffic announcements and the digital messages.

13. The receiver according to claim 12, further comprising a management system for coordinating incoming audio and digital information.

14. The receiver of according to claim 12, wherein the means for receiving the traffic announcements is configured to receive traffic announcements that include digitized voice signals.

15. A method for transmitting a radio traffic announcement via a Digital Audio Broadcasting, comprising the steps of:

transmitting the radio traffic announcement in an audio stream;

transmitting a digitally-encoded traffic message as digital signals; and linking the digital signals and the radio traffic announcement via a multimedia object.

16. The method according to claim 15, wherein the digital signals are transmitted in a direct time correlation with the radio traffic announcement.

17. The method according to claim 15, wherein messages of a traffic message channel complying with an alert C protocol are used as the digital signals.

18. The method according to claim 15, wherein the digital signals include headers and a data area.

19. The method according to claim 15, wherein a beginning and an end of the radio traffic announcement are indicated by a link object.

20. The method according to claim 19, wherein the link object contains a reference to a digital message in an optional header.

21. The method according to claim 15, wherein the multimedia object transmits the digital signals in a header.

22. The method according to claim 15, wherein the traffic announcement is transmitted in encoded digital form, said method further comprising the steps of:

decoding the traffic announcement using a decoder; and managing information obtained from the decoding step by using the digitally-encoded traffic message.

23. The method according to claim 15, further comprising the steps of:

storing a plurality of radio traffic announcements together with a plurality of linked digitally-encoded traffic messages in a digital radio receiver; and selecting a desired announcement from the plurality of stored radio traffic announcements.

24. The method according to claim 15, wherein the radio traffic announcements include a digitized voice signal.

25. The method according to claim 15, wherein the digitally-encoded traffic message is transmitted on a special channel.

26. A method for transmitting a radio traffic announcement via a Digital Audio Broadcasting, comprising the steps of:

transmitting an audio segment of the radio traffic announcement; and transmitting a digitally-encoded traffic message as digital signals;

wherein the digital signals are transmitted in a header of a multimedia object, and the audio segment is transmitted in a body of the multimedia object.

27. The method according to claim 26, wherein the audio segment of the radio traffic announcement includes a digitized voice signal.

28. The method according to claim 26, wherein the digitally-encoded traffic message is transmitted on a special channel.

29. A method for transmitting a radio traffic announcement via a Digital Audio Broadcasting, comprising the steps of:

transmitting an audio segment of the radio traffic announcement; and transmitting a digitally-encoded traffic message as digital signals;

wherein the digital signals are transmitted in a body of a multimedia object, and the audio segment is transmitted in a header of the multimedia object.

30. The method according to claim 29, wherein a plurality of audio segments, video segments and text labels are transmitted in the header of the multimedia object.

31. The method according to claim 30, wherein the plurality of audio segments contain different languages.

32. The method according to claim 29, wherein the audio segment of the radio traffic announcement includes a digitized voice signal.

33. The method according to claim 29, wherein the digitally-encoded traffic message is transmitted on a special channel.

* * * * *

UNITED STATES PATENT AND TRADEMARK OFFICE

CERTIFICATE OF CORRECTION

PATENT NO. : 6,434,138 B2
DATED : August 13, 2002
INVENTOR(S) : Ulrich Kersken et al.

It is certified that error appears in the above-identified patent and that said Letters Patent is hereby corrected as shown below:

<u>Column 1,</u>
Line 11, change "(playing back)." to -- (playing back) announcements. --

<u>Column 2,</u>
Line 42, insert -- DETAILED DESCRIPTION --

<u>Column 3,</u>
Line 7, after "G." start new paragraph
Line 20, change "extension, the" to -- extension, and the --
Line 40, after "service." start new paragraph
Line 52, after "stream." start new paragraph <u>Column 4,</u>
Line 52, after "management." start new paragraph
Line 55, after "output." start new paragraph Signed and Sealed this Eleventh Day of November, 2003

JAMES E. ROGAN
*Director of the United States Patent and Trademark Office*